C. W. SPAYD.
Wheels for Vehicles.

No. 142,876.　　　　　　　　　　Patented September 16, 1873.

Witnesses:
P. C. Dieterich
C. Sedgwick

Inventor:
C. W. Spayd
Per
　　Attorneys.

UNITED STATES PATENT OFFICE.

CHARLES W. SPAYD, OF WILKESBARRE, PENNSYLVANIA.

IMPROVEMENT IN WHEELS FOR VEHICLES.

Specification forming part of Letters Patent No. 142,876, dated September 16, 1873; application filed April 12, 1873.

*To all whom it may concern:*

Be it known that I, CHARLES W. SPAYD, of Wilkesbarre, in the county of Luzerne and State of Pennsylvania, have invented a new and useful Improvement in Wheels, of which the following is a specification:

The invention consists in the improvement of wheels, as hereinafter described and claimed.

Figure 1:
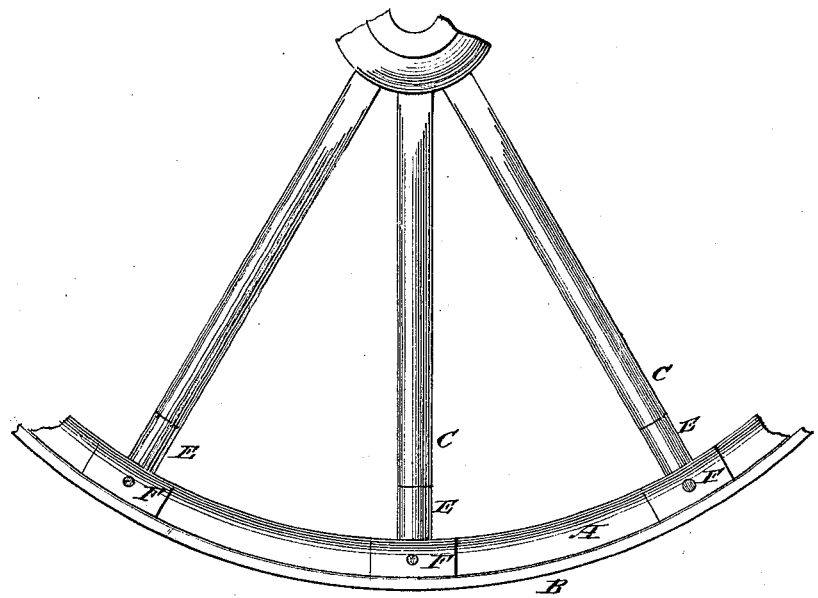
Figure 3:
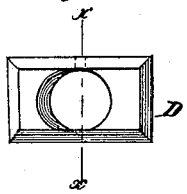
Figure 2:
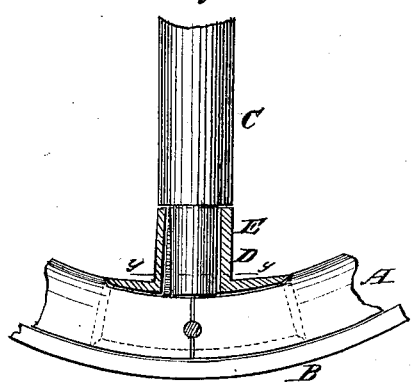
Figure 4:
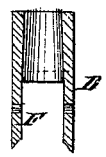
Figure 5:

In the accompanying drawing, Figure 1 is a side view. Fig. 2 is a section of the socket applied. Fig. 3 is an end view of the combined socket and clip. Fig. 4 is a section of Fig. 3 on the line $x\ x$. Fig. 5 is a section of Fig. 2 on the line $y\ y$.

Similar letters of reference indicate corresponding parts.

A is the felly, B is the tire, C the spokes, of the wheel; and D represents the combined socket and clip, of which E is the spoke-socket, and F is the felly-clip. The end of the socket is circular where the tenon of the spoke enters, but its other end is oval, so that the spoke may be tightly wedged in the socket, as seen in Figs. 2 and 5. The end of the spoke does not enter the felly, but rests on the felly, as seen in Fig. 2. The clip F consists of two wings, which are let into the sides of the felly, and are securely fastened thereto by means of a rivet or bolt, G. Where the felly of the wheel is made in sections, the ends are well secured by the clip, as seen in Fig. 2. The clip is beveled, as seen at H H, so that the felly will be securely bound by the tire and prevented from splitting. When the tire is set, the wedge in the end of the spoke is prevented from working out, and the wheel is complete.

By means of the combined socket and clip the spokes and felly are secured in the most permanent manner.

Having thus described my invention, I claim as new, and desire to secure by Letters Patent—

The combined spoke-socket and felly-clip D of a wheel, having one end of the socket E circular, but gradually changed in shape to an oval toward the felly to allow the spoke to be wedged, all in the manner described.

CHARLES WM. SPAYD.

Witnesses:
A. H. KETCHAM,
C. B. SUTTON.